(12) United States Patent
Park

(10) Patent No.: US 7,334,296 B2
(45) Date of Patent: Feb. 26, 2008

(54) HINGE DEVICE AND PORTABLE TERMINAL HAVING THE SAME

(75) Inventor: Jeong-Seok Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 10/938,986

(22) Filed: Sep. 10, 2004

(65) Prior Publication Data
US 2005/0138772 A1 Jun. 30, 2005

(30) Foreign Application Priority Data
Dec. 30, 2003 (KR) .................. 10-2003-0100237

(51) Int. Cl.
*E05F 1/08* (2006.01)
(52) U.S. Cl. .................. 16/330; 16/327; 16/303; 455/575.3
(58) Field of Classification Search .................. 16/330, 16/303, 285, 284, 367, 239, 244, 243, 248; 361/683; 455/575.1, 575.3; 379/433.13; 248/291.1, 291.11, 292.13
See application file for complete search history.

(56) References Cited

U.S. PATENT DOCUMENTS 1,833,972 A * 12/1931 Olson .................. 16/243
4,215,449 A * 8/1980 Loikitz .................. 16/50
5,937,062 A * 8/1999 Sun et al. .................. 379/433.13
6,678,539 B1 * 1/2004 Lu .................. 455/575.1
6,886,221 B2 * 5/2005 Minami et al. .................. 16/324
2004/0244147 A1 * 12/2004 Qin et al. .................. 16/330

FOREIGN PATENT DOCUMENTS

JP          11050735 A   *  2/1999

* cited by examiner

*Primary Examiner*—Robert J Sandy
(74) *Attorney, Agent, or Firm*—The Farrell Law Firm, PC

(57) ABSTRACT

A hinge device for a portable terminal having a first housing and a second housing rotatably coupled to the first housing such that the second housing is moved between an opened position and a closed position with respect to the first housing is provided. The hinge device extends in one direction to provide a hinge axis, which is a rotational center of the second housing. The hinge device allows the second housing to linearly move in a hinge axis direction and generates rotational force to rotationally shift the second housing into the opened position or the closed position with respect to the first housing about the hinge axis as the second housing linearly moves in the hinge axis direction. A user easily and conveniently opens or closes the portable terminal by horizontally moving one housing with respect to the other housing.

29 Claims, 17 Drawing Sheets

HINGE DEVICE AND PORTABLE TERMINAL HAVING THE SAME

PRIORITY

This application claims priority to an application entitled "Hinge Device And Portable Terminal Having The Same" filed in the Korean Intellectual Property Office on Dec. 30, 2003 and assigned Serial No. 2003-100237, the contents of which are hereby incorporated by reference.

BACKGROUND OF THE INVENTION

1. Field of the Invention

The present invention relates to a portable terminal, and more particularly to a hinge device utilized in a portable terminal.

2. Description of the Related Art

Generally, the term "portable terminal" refers to electronic appliances allowing users to make wire/wireless communication with other terminals or base stations while carrying the portable terminals. Such portable terminals may include cellular phones or PDAs.

As wireless communication has been developed, conventional telephone communication has been replaced by wireless communication with many functions, including wireless paging services and wireless character transfer services. Recently, most portable terminals have various functions providing multi-media services, such as image communication services and moving picture transfer services. In addition, as portable terminals have been widely used, consumers have come to demand not only various functions of portable terminals, but also various designs of portable terminals.

Such portable terminals are classified into bar-type portable terminals, flip-type portable terminals, and folder-type portable terminals according to constructions thereof. The bar-type portable terminal has a bar-shaped housing, the flip-type portable terminal has a bar-shaped housing and a flip or a cover rotatably coupled to the bar-shaped housing by means of a hinge device, and the folder-type portable terminal has a bar-shaped housing and a folder foldably coupled to the bar-shaped housing by means of a hinge device.

A current tendency for such portable terminals is to make portable terminals both lightweight and compact to facilitate portability. with folder-type portable terminals, a folder is maintained in a closed position with respect to a phone body in a call wait mode, so that a user can easily carry the folder-type portable terminal. In a communication mode, the folder is rotated to an open position with respect to the phone body so that the user can conveniently communicate with other users.

In addition, a hinge device for rotatably coupling a flip of a flip-type portable terminal or a folder of a folder-type portable terminal to a phone body applies a bias force to the flip or the folder in such a manner that the flip or the folder rotates to a completely opened position with respect to the phone body, if the flip or the folder has been rotated with respect the phone body beyond a predetermined angle, even if external force is not additionally applied to the flip or the folder. The flip or the folder is returned to a closed position with respect to the phone body by means of the hinge device if the flip or the folder is rotated back towards the phone body past the predetermined angle.

One example of such hinge devices is disclosed in U.S. Pat. No. 6,292,980 entitled "Hinge Mechanism Of Portable Phone" and assigned to the assignee of the present invention on Sep. 25, 2001. The hinge mechanism disclosed in U.S. Pat. No. 6,292,980 includes a hinge cam and a hinge shaft having a mountain-shaped portion and a valley-shaped portion, respectively. In addition, a spring is accommodated in a hinge housing in order to closely bias the hinge cam towards the hinge shaft. A folder or a flip is opened or closed with respect to a phone body by means of curved surfaces of the mountain-shaped portion and the valley-shaped portion and the bias force of the spring.

However, according to the above hinge mechanism, the folder is opened or closed with respect to the phone body by simply rotating the folder with one hand while gripping the phone body with the other hand.

SUMMARY OF THE INVENTION

Accordingly, an object of the present invention is to provide a hinge device and a portable terminal having the same, in which a pair of housings are folded in opposition to each other so that an opening operation or a closing operation of the portable terminal can be easily carried out.

To accomplish the above object, there is provided a hinge device of a portable terminal, the hinge device including a first hinge cam having a cylindrical shape extending in a length direction thereof and formed at a first end thereof with a first inclined surface; a second hinge cam accommodated in the first hinge cam such that the second hinge cam linearly moves lengthwise along the first hinge cam and formed at a first end thereof with a valley-shaped portion extending in a radially outward direction thereof; a third hinge cam, a first end of which is partially accommodated in the first hinge cam in order to be rotated in the first hinge cam, formed at the first end thereof with a mountain-shaped portion engaged with the valley-shaped portion of the second hinge cam, and formed at an outer peripheral surface thereof with a second inclined surface slidably making contact with the first inclined surface of the first hinge cam; and an elastic member accommodated in the first hinge cam in order to apply a bias force in a direction urging the mountain-shaped portion to engage with the valley-shaped portion.

According to another embodiment of the present invention, there is provided a portable terminal having a first housing and a second housing rotatably coupled to the first housing such that the second housing is rotated between an opened position and a closed position with respect to the first housing, the portable terminal including a hinge device extending in one direction to provide a hinge axis, which is a rotational center of the second housing, wherein the hinge device allows the second housing to linearly move in a hinge axis direction and generates rotational force to rotationally shift the second housing into the opened position or the closed position with respect to the first housing about the hinge axis as the second housing linearly moves in the hinge axis direction.

According to still another embodiment of the present invention, there is provided a hinge device of a portable terminal, the hinge device including a first hinge cam having a cylindrical shape extending in a length direction thereof and formed at a first end thereof with a first inclined surface; a second hinge cam accommodated in the first hinge cam such that the second hinge cam linearly moves lengthwise along the first hinge cam and formed at a first end thereof with a valley-shaped portion extending in a radially outward direction thereof; a third hinge cam, a first end of which is partially accommodated in the first hinge cam in order to be rotated in the first hinge cam, formed at the first end thereof with a mountain-shaped portion engaged with the valley-shaped portion of the second hinge cam, formed at an outer peripheral surface thereof with a second inclined surface slidably making contact with the first inclined surface of the first hinge cam, and having a hinge shaft extending in a length direction thereof from a second end of the third hinge cam; a first elastic member accommodated in the first hinge cam in order to apply a bias force in a direction urging the mountain-shaped portion to engage with the valley-shaped portion; a hinge housing extending in a length direction thereof so as to accommodate the third hinge cam therein while linearly or rotatably moving together with third hinge cam, the hinge shaft protruding out of a first end of the hinge housing; a support block having a cylindrical shape, formed with a perforated hole extending in a length direction thereof, and coupled to the first hinge cam; and a second elastic member interposed between the hinge housing and the support block so as to apply a bias force in a direction urging the hinge housing to move away from the support block.

BRIEF DESCRIPTION OF THE DRAWINGS

The above objects and other features and advantages of the present invention will be more apparent from the following detailed description taken in conjunction with the accompanying drawings, in which.

DETAILED DESCRIPTION OF THE PREFERRED EMBODIMENTS

Figure 1:
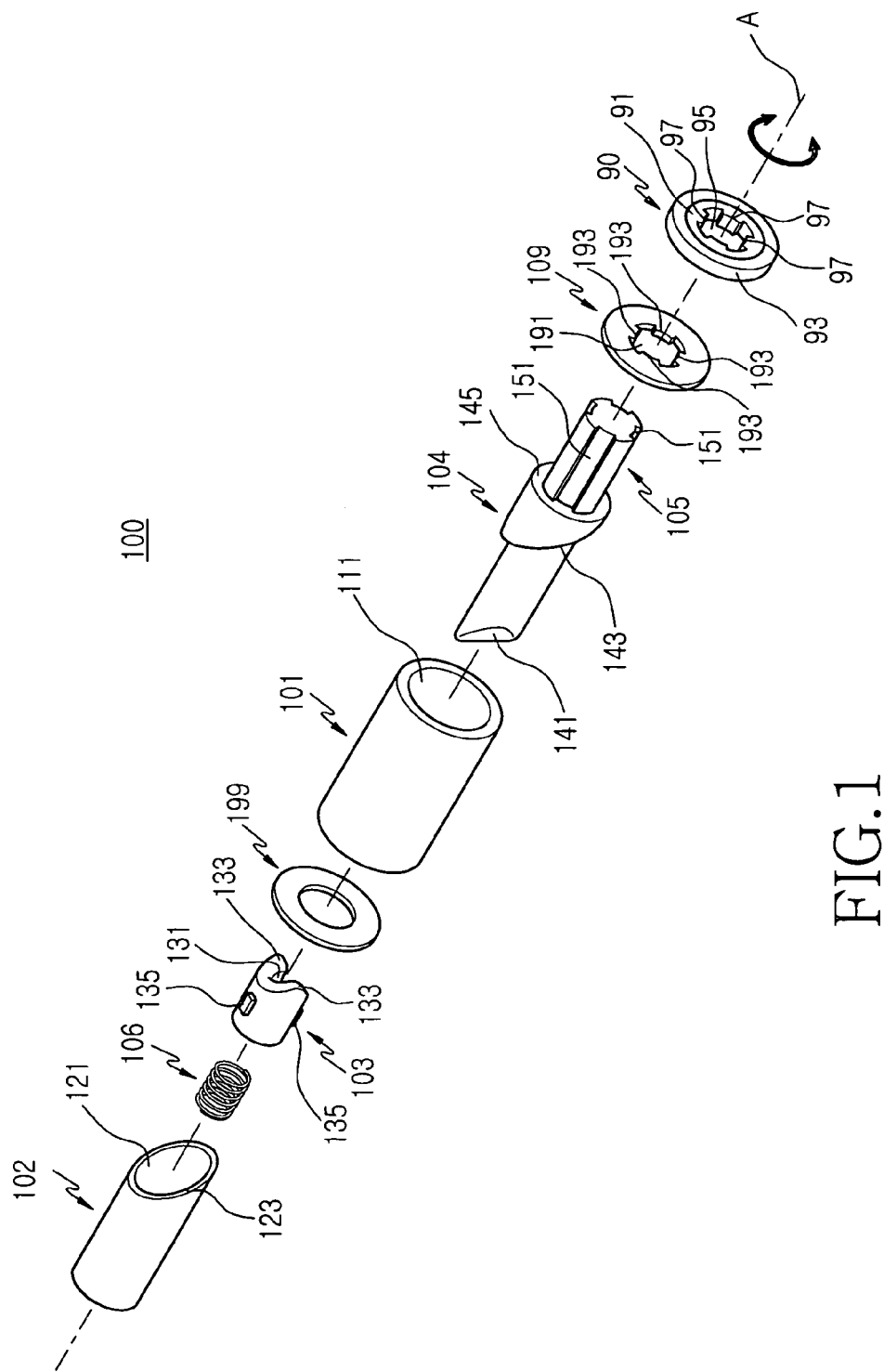
FIG. 1 is an exploded perspective view showing a hinge device of a portable terminal according to an exemplary embodiment of the present invention.

Hereinafter, a preferred embodiment of the present invention will be described with reference to the accompanying drawings. In the following description of the present invention, the same reference numerals are used to designate the same or similar components and a detailed description of known functions and configurations incorporated herein will be omitted when it may make the subject matter of the present invention unclear.

Figure 2:
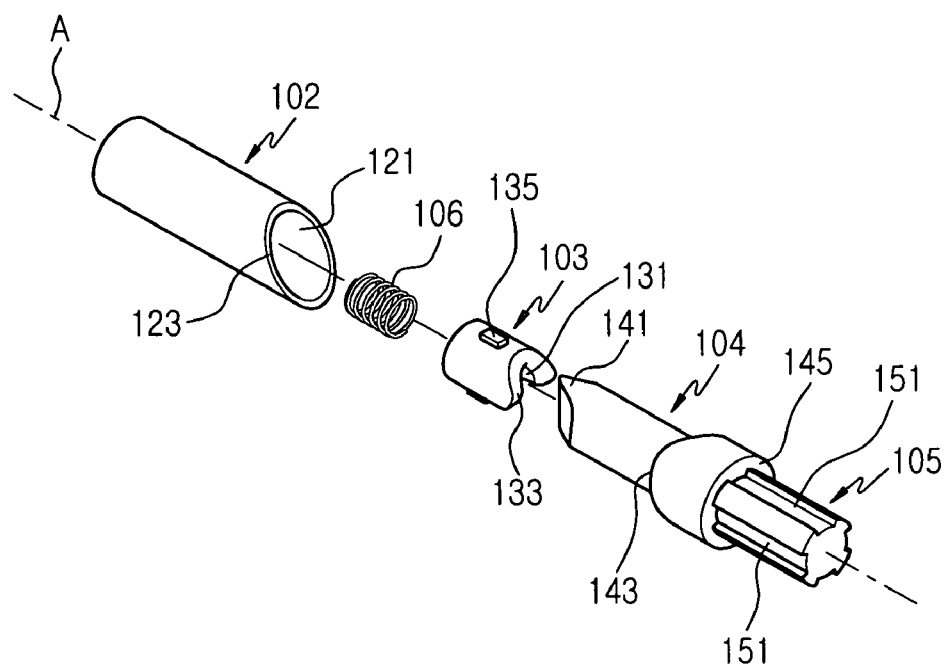
FIG. 2 is an exploded perspective view showing main components of a hinge device shown in FIG. 1.

FIG. 1 is an exploded perspective view showing a hinge device 100 of a portable terminal according to an exemplary embodiment of the present invention, and FIG. 2 is an exploded perspective view showing the main components of the hinge device 100 shown in FIG. 1. As shown in FIGS. 1 and 2, the hinge device 100 according to the exemplary embodiment of the present invention includes a hinge housing 101, first to third hinge cams 102 to 104 and an elastic member 106 arranged along a hinge axis A.

The hinge housing 101 has a receiving cavity 111 extending lengthwise along the direction of the hinge axis A so as to receive the third hinge cam 104 therein.

The first hinge cam 102 has a cylindrical shape extending lengthwise along the direction of the hinge axis A and formed at a first end thereof with a first inclined surface 123. The first hinge cam 102 includes an internal cavity 121 for receiving the second hinge cam 103 and the elastic member 106 therein.

The second hinge cam 103 is accommodated in the first hinge cam 102 such that the second hinge cam 103 linearly moves in the first hinge cam 102. The second hinge cam 103 is formed at a first end thereof with a valley-shaped portion 131 extending in a radially outward direction thereof. A pair of protrusions 133, which protrude in a length direction of the first hinge cam 102, are formed at both sides of the valley-shaped portion 131. In order to guide a linear movement of the second hinge cam 103 within the first hinge cam 102, at least one guide protrusion 135 is formed at an outer peripheral surface of the second hinge cam 103. In addition, although it is not illustrated, a guide slot is formed lengthwise along an inner peripheral surface of the first hinge cam 102 so that the guide protrusion 135 slides within the guide slot, thereby guiding the linear movement of the second hinge cam 103. However, the linear movement of the second hinge cam 103 can be guided through various manners without using the guide protrusion 135. For example, in order to guide the linear movement of the second hinge cam 103, a planar surface may be formed lengthwise along an outer peripheral surface of the second hinge cam 103 or the second hinge cam 103 may be formed in a rectangular column structure extending in a hinge axis direction while forming the internal cavity 121 of the first hinge cam 102 in a shape corresponding to a shape of the second hinge cam 103.

A predetermined portion of the third hinge cam 104 is accommodated in the internal cavity 121 of the first hinge cam 102. A mountain-shaped portion 141 which engages the valley-shaped portion 131 of the second hinge cam 103 is formed at one end of the third hinge cam 104. The third hinge cam 104 is formed at an outer peripheral surface thereof with a second inclined surface 143, which slidably makes contact with the first inclined surface 123.

The elastic member 106 is accommodated in the first hinge cam 102 in order to apply a bias force to urge the second hinge cam 103 towards the third hinge cam 104. In consideration of the shape and bias direction of the first hinge cam 102, the elastic member 106 may preferably include a coil spring.

The valley-shaped portion 131 of the second hinge cam 103 is engaged with the mountain-shaped portion 141 of the third hinge cam 104 under the of bias force of the elastic member 106. As mentioned above, the elastic member 106 applies the bias force to the second hinge cam 103 such that the second hinge cam 103 is closely adjacent to the third hinge cam 104. Therefore, if the third hinge cam 104 is rotated so that the mountain-shaped portion 141 is offset from the valley-shaped portion 131, the bias force of the elastic member 106 is applied to the third hinge cam 104 so that third hinge cam 104 is rotated, allowing the mountain-shaped portion 141 to engage again with the valley-shaped portion 131. At this time, the third hinge cam 104 relatively rotates with respect to the second hinge cam 103. If the second hinge cam 103 is relatively rotated with respect to the third hinge cam 104, the elastic member 106 applies the bias force to the second hinge cam 103 such that the mountain-shaped portion 141 is engaged with the valley-shaped portion 131.

Figure 3:
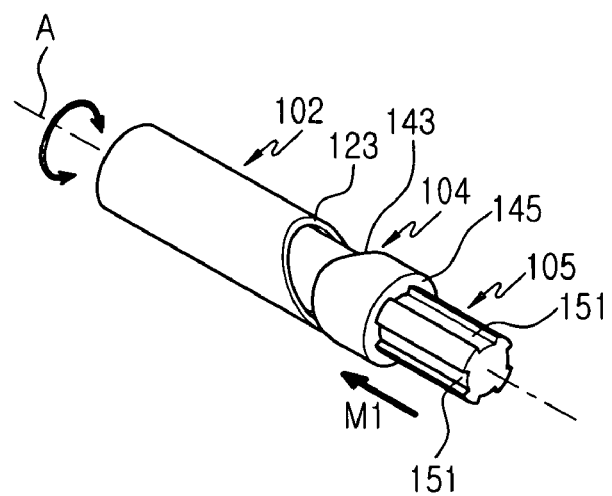
FIGS. 3 to 7 are views illustrating an operation of the hinge device shown in FIG. 1.
Figure 4:
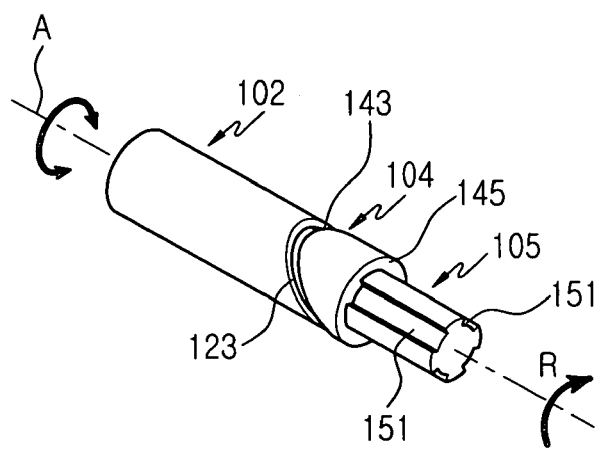

Referring to FIGS. 3 and 4, the third hinge cam 104 linearly moves lengthwise along the first hinge cam 102 while urging the first inclined surface 123 to make contact with the second inclined surface 143. When the third hinge cam 104 linearly moves in a first direction M1 towards the first hinge cam 102, the third hinge cam 104 is rotated in a second direction R such that the first inclined surface 123 matches with the second inclined surface 143.

Figure 5:
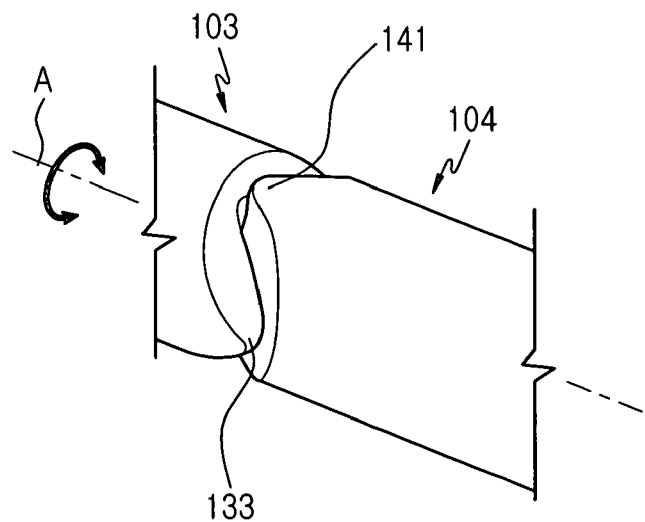

In addition, referring to FIGS. 3 and 5, in a state in which the first inclined surface 123 is offset from the third inclined surface 143, the mountain-shaped portion 141 of the third hinge cam 104 is engaged with the valley-shaped portion 131 of the second hinge cam 103.

Figure 6:
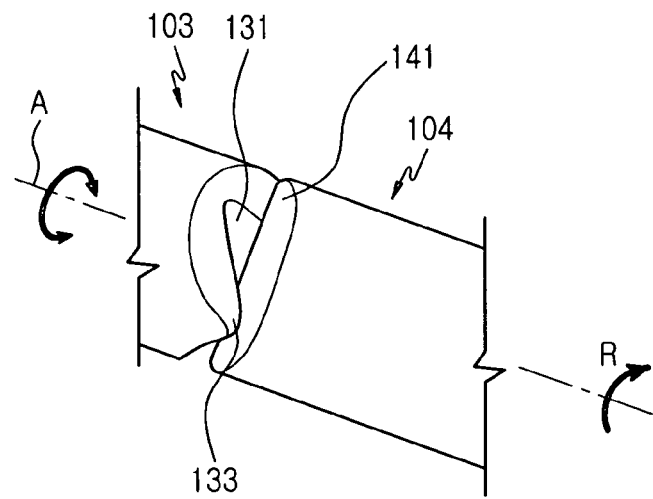

That is, as shown in FIGS. 3 and 5, when the first inclined surface 123 is offset from the second inclined surface 143, the valley-shaped portion 131 of the second hinge cam 103 is engaged with the mountain-shaped portion 141 of the third hinge cam 104. Herein, referring to FIGS. 4 and 6, if the third hinge cam 104 moves in the first direction M1, the third hinge cam 104 is rotated in the second direction R due to an engagement between the first and second inclined surfaces 123 and 143, so that the mountain-shaped portion 141 is offset from the valley-shaped portion 131.

If the mountain-shaped portion 141 is offset from the valley-shaped portion 131, the second hinge cam 103 becomes more distant from the third hinge cam 104 while compressing the elastic member 106. Compressed bias force of the elastic member 106 urges the second hinge cam 103 towards the third hinge cam 104. Accordingly, the third hinge cam 104 is rotated in a predetermined direction, allowing the mountain-shaped portion 141 to engage again with the valley-shaped portion 131.

Figure 7:
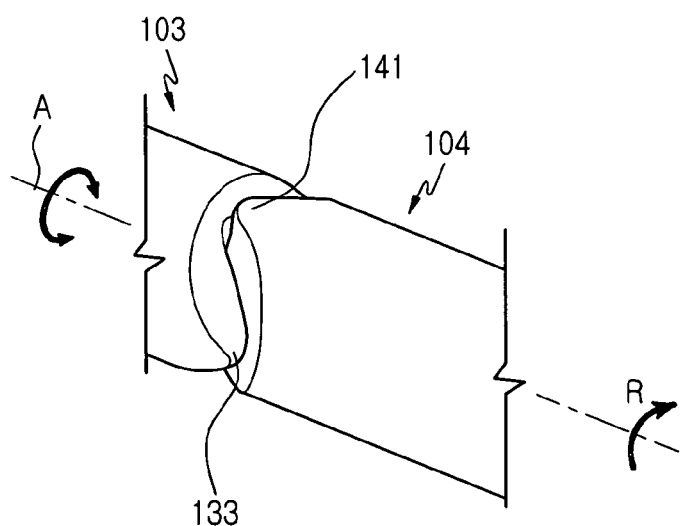

Referring to FIG. 7, when the third hinge cam 104 moves in the first direction M1 while rotating in the second direction R, if the mountain-shaped portion 141 released from the valley-shaped portion 131 moves beyond an end of the protrusion 133 of the second hinge cam 103, the second hinge cam 103 moves towards the third hinge cam 104 by means of the bias force of the elastic member 106 so that the protrusion 133 causes rotation of the mountain-shaped portion 141. Thus, the third hinge cam 104 further rotates in the second direction R, so that the mountain-shaped portion 141 is engaged again with the valley-shaped portion 131.

That is, when the third hinge cam 104 moves in the first direction M1 while rotating in the second direction R, the second and third hinge cams 103 and 104 are subject to rotational force in a direction reverse to the second direction R until the mountain-shaped portion 141 has moved beyond the protrusion 133 of the second hinge cam 103. In addition, when the third hinge cam 104 moves in the first direction M1 while rotating in the second direction R, the second and third hinge cams 103 and 104 are subject to rotational force in the second direction R, if the mountain-shaped portion 141 has moved beyond the protrusion 133 of the second hinge cam 103.

Referring back to FIG. 1, the hinge device 100 further includes a hinge shaft 105, a housing cap 109 and a roller 90 in order to rotatably couple the pair of housings of the portable terminal to each other.

The hinge shaft 105 is integrally formed with a second end of the third hinge cam 104 and extending therefrom such that an end of the hinge shaft 105 protrudes out of the first end of the hinge housing 101. At least one slot 151 is formed lengthwise along an outer peripheral surface of the hinge shaft 105. A stepped surface 145 is formed between the third hinge cam 104 and the hinge shaft 105.

The housing cap 109 has a shaft hole 191 for receiving the hinge shaft 105. The housing cap 109 is fixed to the first end of the hinge housing 101 so as to support the stepped surface 145. The shaft hole 191 is provided at an inner wall thereof with a first support rib 193 engaged with the support slot 151 of the hinge shaft 105. Due to the engagement between the first support rib 193 and the support slot 151, the hinge shaft 105, the housing cap 109 and the hinge housing 101 are simultaneously rotated together with the third hinge cam 104. In addition, when the hinge housing 101 moves in a length direction thereof caused by external force, the housing cap 109 pushes the stepped surface 145 so that the third hinge cam 104 linearly moves towards the first hinge cam 102.

Another housing cap 199 is fixed to the second end of the hinge housing 101 so as to close the receiving cavity 111 while allowing the first hinge cam 102 to pass therethrough.

The roller 90 is a bearing and includes an inner ring 91 and an outer ring 93, which are coaxially and rotatably coupled with each other. The inner ring 91 is coupled to the hinge shaft 105 such that the inner ring 91 can linearly move along the hinge shaft 105, and the outer ring 93 is fixed to a predetermined portion of the portable terminal. Accordingly, the roller 90 may support a linear movement and a rotational movement of the hinge shaft 105 in the portable terminal. The inner ring 91 may include a hole 95 for receiving the hinge shaft 105 and a second support rib 97 engaged with the support slot 151 of the hinge shaft 105. Thus, the inner ring 91 rotates together with the hinge shaft 105 while supporting the linear movement of the hinge shaft 105.

Figure 8:
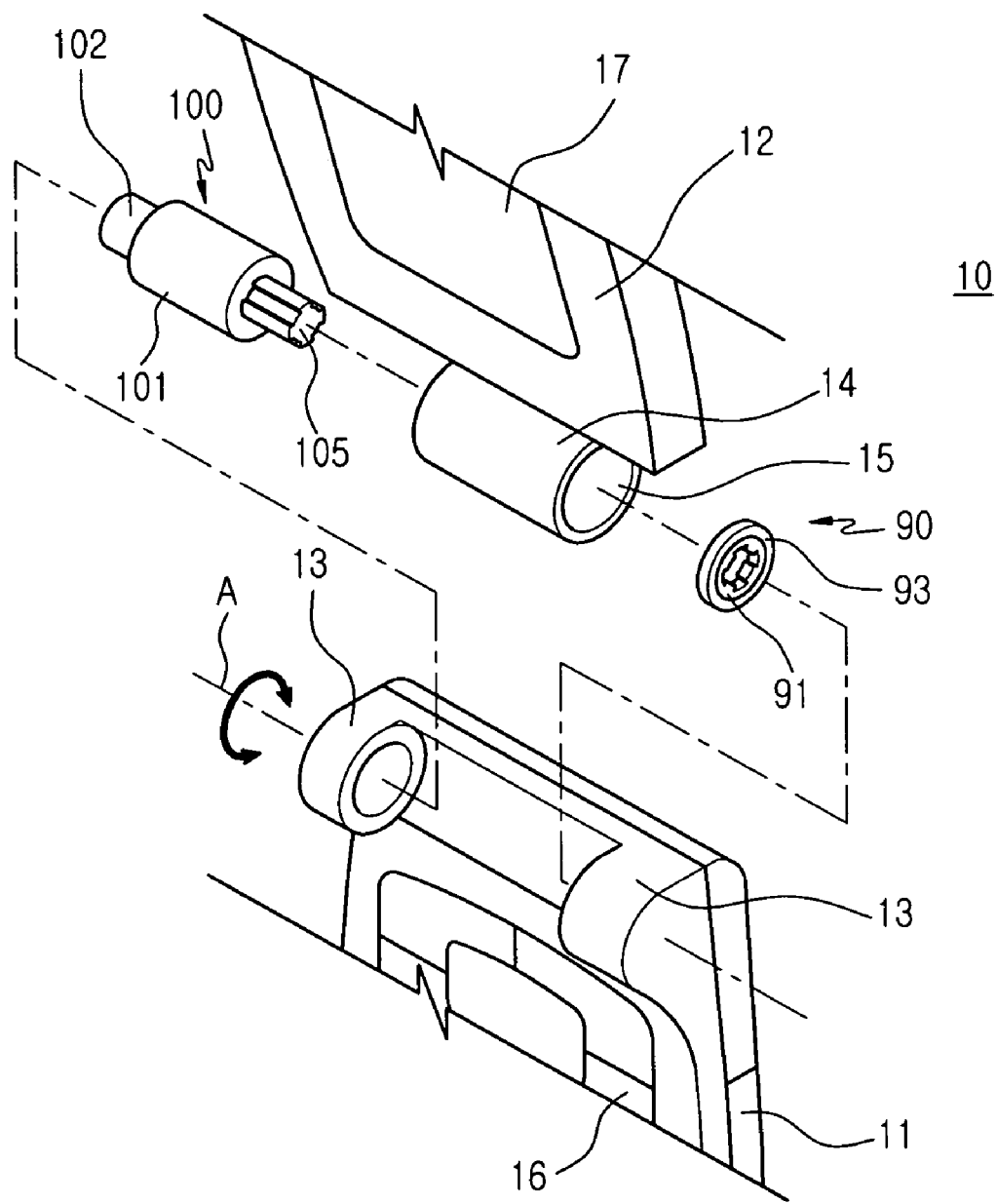
FIG. 8 is an exploded perspective view showing a hinge device coupled to a portable terminal.

FIG. 8 shows the hinge shaft 100 having the above-mentioned construction coupled to the portable terminal 10.

Referring to FIG. 8, the portable terminal 10 is a folder-type portable terminal including a first housing 11 provided at a front surface thereof with a keypad 16 and formed at both upper side portions thereof with a pair of side hinge arms 13 aligned in opposition to each other, and a second housing 12 rotatably coupled to the first housing 11 in such a manner that the second housing 12 can be positioned in an opened position or a closed position with respect to the first housing 11. The second housing 12 is provided at one surface thereof with a display unit 17 aligned in opposition to the first housing 11.

A center hinge arm 14 is connected to one end of the second housing 12 such that the center hinge arm 14 is rotatably coupled between the side hinge arms 13. In addition, the center hinge arm 14 extends in the hinge axis direction A, and is formed with a receiving hole 15 therein for receiving the hinge device 100.

The roller 90 is fixedly coupled to one side hinge arm 13 of the first housing 11, and in particular, the outer ring 93 of the roller 90 is fixed to the side hinge arm 13. When the hinge device 100 is accommodated in the center hinge arm 14, the hinge shaft 105 protruding out of the first end of the hinge housing 101 is coupled with the hole 95 of the roller 90. At this time, the roller 90 may support the linear movement of the third hinge cam 104 and the hinge shaft 105. At the same time, the inner ring 91 rotates with respect to the outer ring 93, thereby supporting the rotation of the third hinge cam 104.

The first hinge cam 102 protrudes beyond the second end of the hinge housing 101 so that the first hinge cam 102 may be fixedly coupled to the other side hinge arm 13 of the first housing 11.

As a result, the first hinge cam 102 and the hinge shaft 105 are coupled to the side hinge arms 13, respectively, thereby providing the hinge axis A. Thus, the second housing 12 can be shifted into the opened position or the closed position with respect to the first housing 11.

Hereinafter, an operation of the hinge device 100 and an opening/closing operation of the portable terminal 100 will be described in detail with reference to FIGS. 9 to 12.

Figure 9:
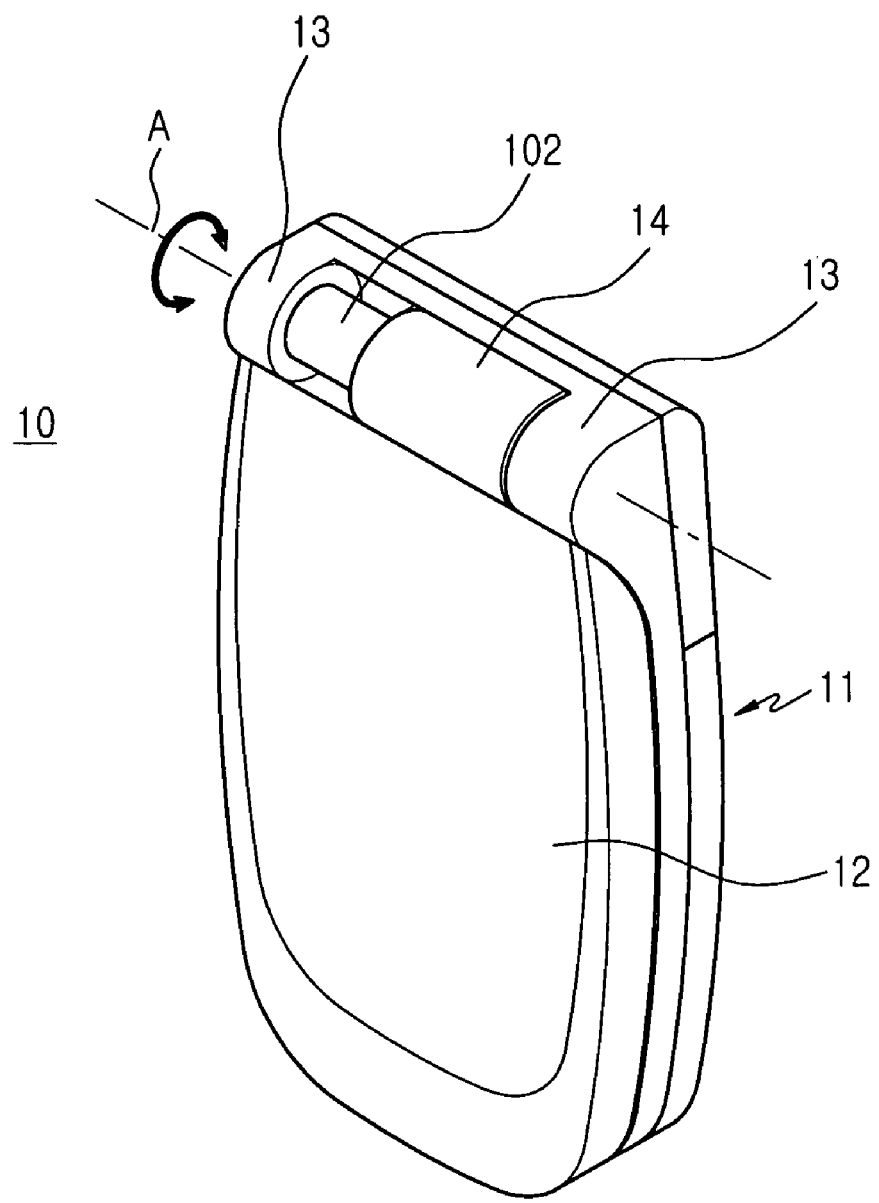
FIGS. 9 to 12 are views showing an opening operation of a second housing of a portable terminal shown in FIG. 8.

As shown in FIG. 9, when the second housing 12 is in the closed position with respect to the first housing 11, the first and second inclined surfaces 123 and 143 of the first and third hinge cams 102 and 104 are offset from each other so that the valley-shaped portion 131 of the second hinge cam 103 is engaged with the mountain-shaped portion 141 of the third hinge cam 104.

Figure 10:
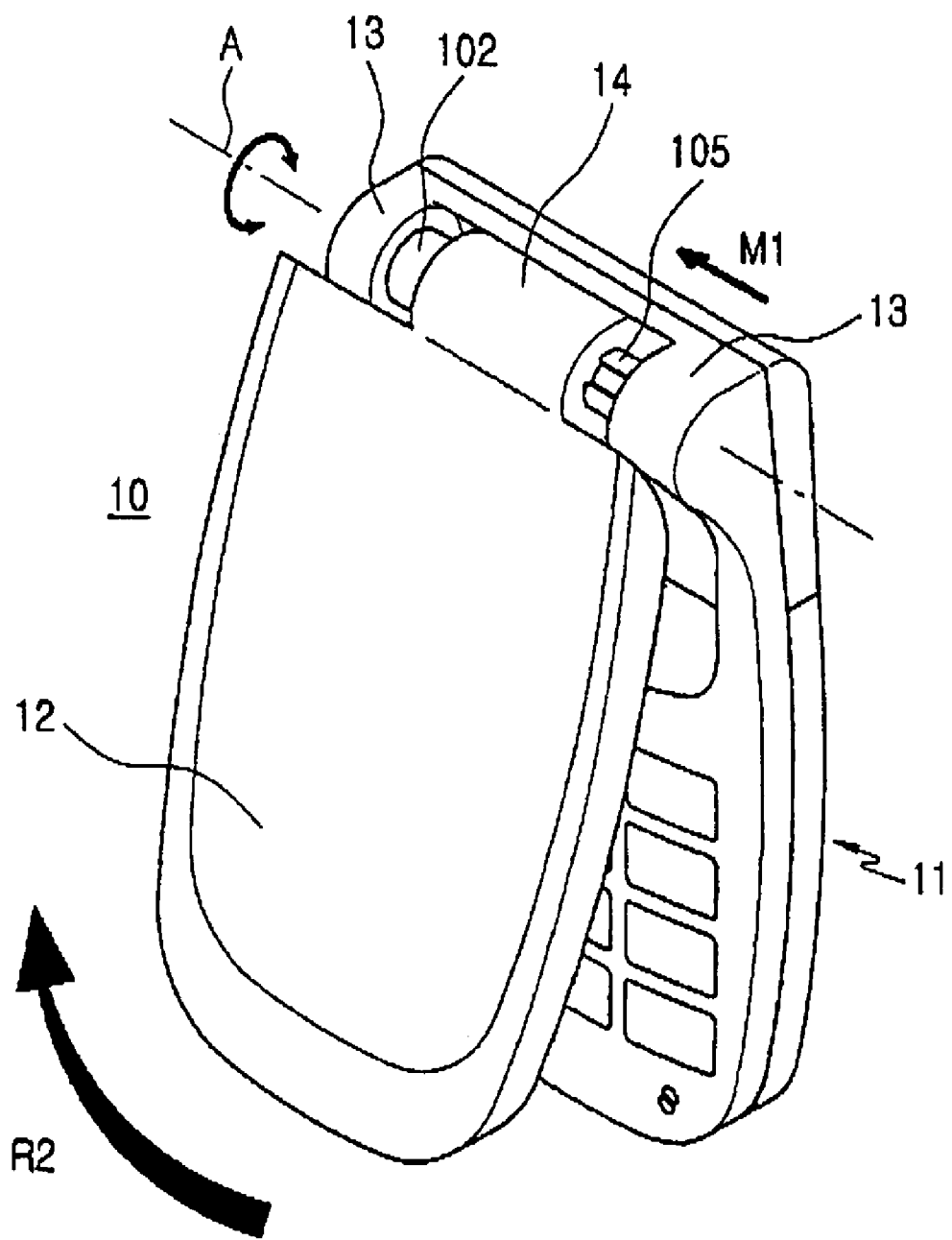
Figure 11:
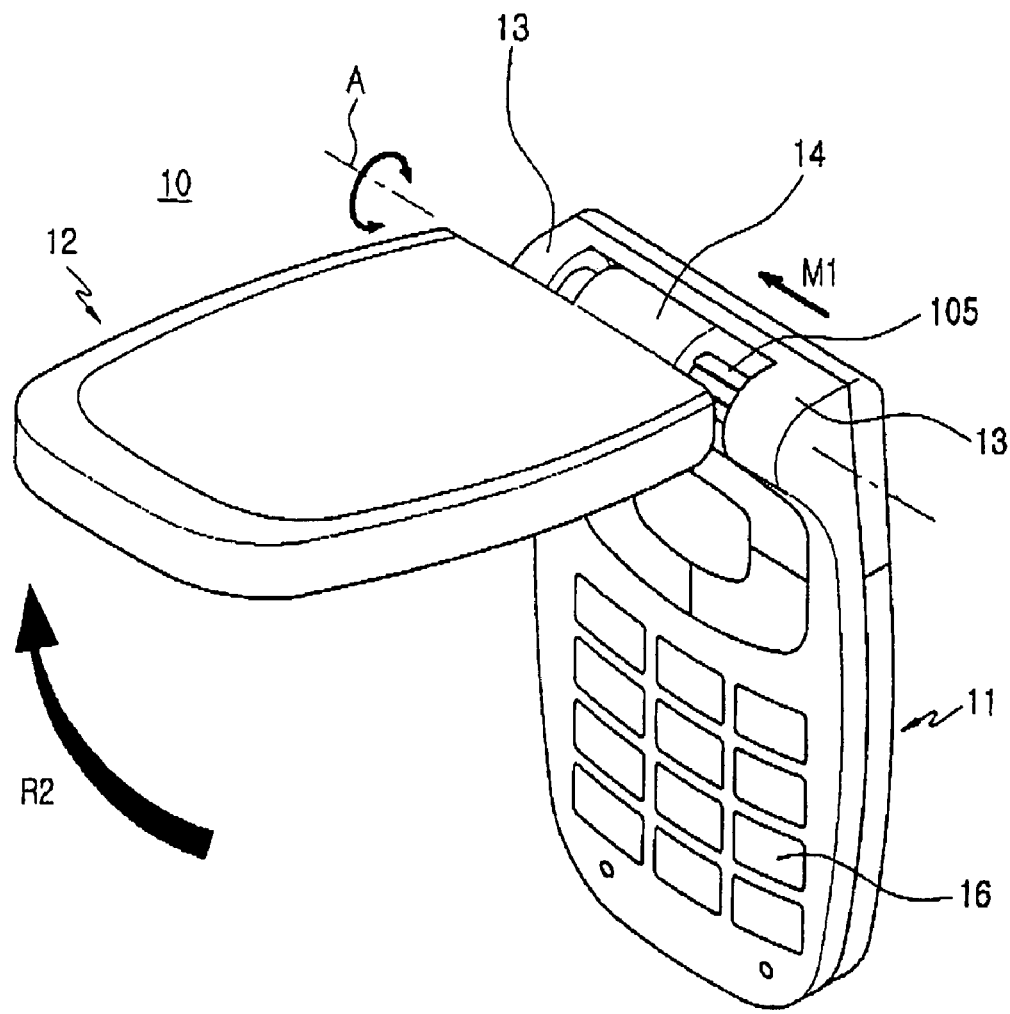

As shown in FIGS. 10 and 11, if a user horizontally moves the second housing 12 in the first direction M1, the hinge housing 101 and the third hinge cam 104 are moved together with the second housing 12 so that the third hinge cam 104 is rotated in a direction urging the first inclined surface 123 to make surface-contact with the second inclined surface 143. As the third hinge cam 104 rotates, the hinge shaft 105, the housing cap 109 and the hinge housing 101 are also rotated together with the third hinge cam 104, thereby moving the second housing 12 toward the opened position with respect to the first housing 11 in third direction R2.

Figure 12:
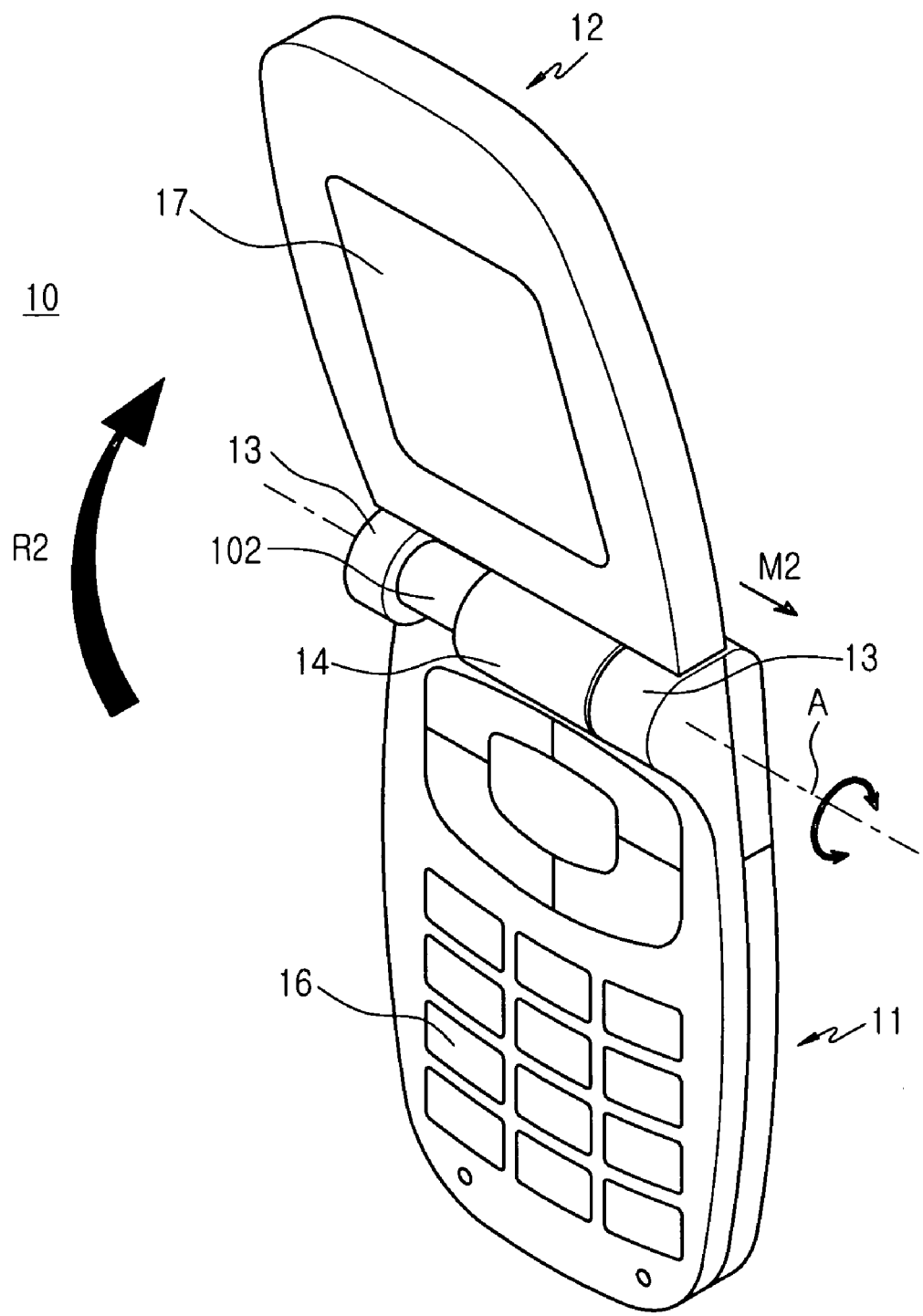

While the second housing 12 is moving in the opened position with respect to the first housing 11, if an end part of the mountain-shaped portion of the third hinge cam 104 moves beyond the end of the protrusion 133 of the second hinge cam 103, the second hinge cam 103 is moved towards the third hinge cam 104 by means of the bias force of the elastic member 106. As the second hinge cam 103 moves towards the third hinge cam 104, the third hinge cam 104 further rotates in a direction causing the mountain-shaped portion 141 to engage with the valley-shaped portion 131. Accordingly, as shown in FIG. 12, the second housing 12 further rotates in third direction R2 even if the user does not apply additional force to the second housing 12, so that the second housing 12 is positioned in the opened position with respect to the first housing 11. When the second housing 12 is positioned in the opened position, an angle between the first and second housings 11 and 12 is about 150°. While third hinge cam 104 is rotating in the direction urging the mountain-shaped portion 141 to engage with the valley-shaped portion 131, the second and third hinge cams 103 and 104 are simultaneously moved in a fourth direction M2 by means of the bias force of the elastic member 106, so the second housing 12 is returned to its initial position in alignment with the first housing 11. That is, the second housing 12 is returned to the initial position. When the second housing 12 is completely opened with respect to the first housing 11, the first inclined surface 123 is offset from the second inclined surface 143 so that the rotation of the third hinge cam 104 is stopped.

The second housing 12 can be returned to the closed position with respect to the first housing 11 through various methods used in the conventional folder-type portable terminal. For instance, the user may forcibly move the second housing 12 into the closed position or horizontally move the second housing 12 in the first direction M1 in order to return the second housing 12 into the closed position by using the hinge device. The user may select one of such various methods in view of convenience.

Hereinafter, a hinge device 200 of the portable terminal according to another embodiment of the present invention will be described in detail with reference to FIGS. 13 to 17. In the following description of the present embodiment, the same reference numerals are used if components have the same structures as the components of the hinge device 100 and a detailed description thereof will be omitted in order to avoid redundancy.

As shown in FIGS. 13 to 17, the hinge device 200 of the portable terminal according to the present embodiment includes a hinge housing 201, first to third hinge cams 102 to 104, a first elastic member 106, a support block 202, a second elastic member 204, and a guide block 203. The first to third hinge cams 102 to 104 and the first elastic member 106 have the same structures as those of the previous embodiment. In addition, the hinge device 200 also has a hinge shaft 105, a housing cap 109 and a roller 90, which are identical to those of the previous embodiment.

The hinge shaft 105 protrudes out of a first end of the hinge housing 201 and a guide rib 215 (FIG. 17) is provided at a second end of the hinge housing 201. An outer diameter of the guide rib 215 is slightly smaller than an outer diameter of the hinge housing 201 so that a predetermined stepped surface is formed between the guide rib 215 and the hinge housing 201. In addition, the hinge housing 201 is formed with a first slit 213 (FIG. 17), which extends lengthwise from the second end of the hinge housing 201. The first slit 213 provides a route for a flexible printed circuit board 299.

The support block 202 has a perforated hole 221 formed at a center thereof and is fixedly coupled to the first hinge cam 102. The support block 202 is formed at an outer peripheral surface thereof with a sliding slot 223 having a predetermined depth.

The second elastic member 204 is interposed between the support block 202 and the hinge housing 201, and in particular, between the support block 202 and the guide block 203 so as to apply a bias force such that the support block 202 becomes more distant from the hinge housing 201. One end of the second elastic member 204 is supported on an end portion of the support block 202.

Figure 15:
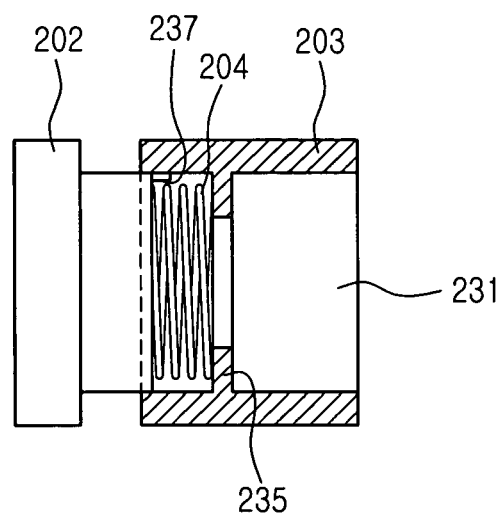
FIG. 15 is a sectional view showing a support block coupled to the guide block shown in FIG. 13.
Figure 16:
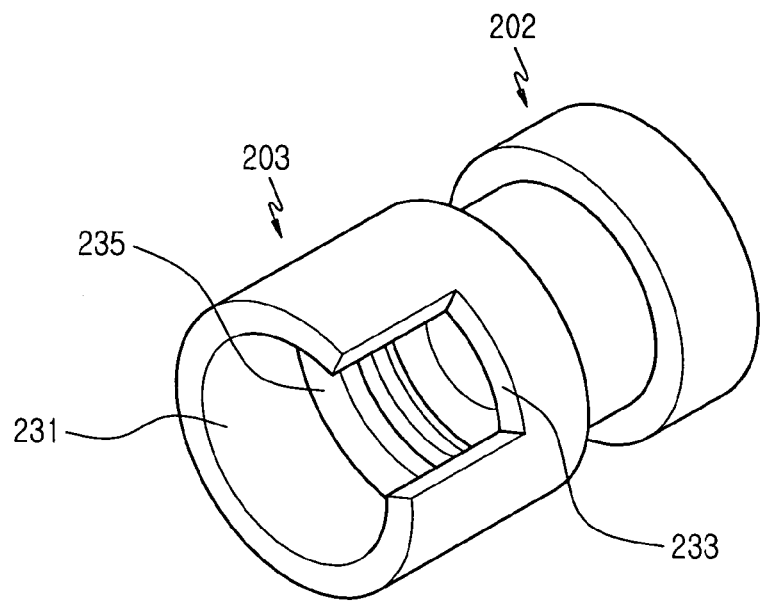
FIG. 16 is a perspective view showing a support block coupled to the guide block shown in FIG. 13.

The guide block 203 has a cylindrical shape having a predetermined length and linearly moves on the support block 202, and is rotatably coupled to the end of the hinge housing 201. Referring to FIGS. 15 and 16, a support rib 235 is formed at an inner peripheral surface of the guide block 203 and extends radially inward of the guide block 203 so as to support the other end of the second elastic member 204. In addition, a second slit 233 extends lengthwise from one end of the guide block 203 and a sliding protrusion 237 (FIG. 17) is formed at an inner peripheral surface 231 of the other end of the guide block 203 such that the sliding protrusion 237 linearly moves along the sliding slot 223 of the support block 202. Due to the linear movement of the sliding protrusion 237, the guide block 203 can linearly move on the support block 202.

Figure 13:
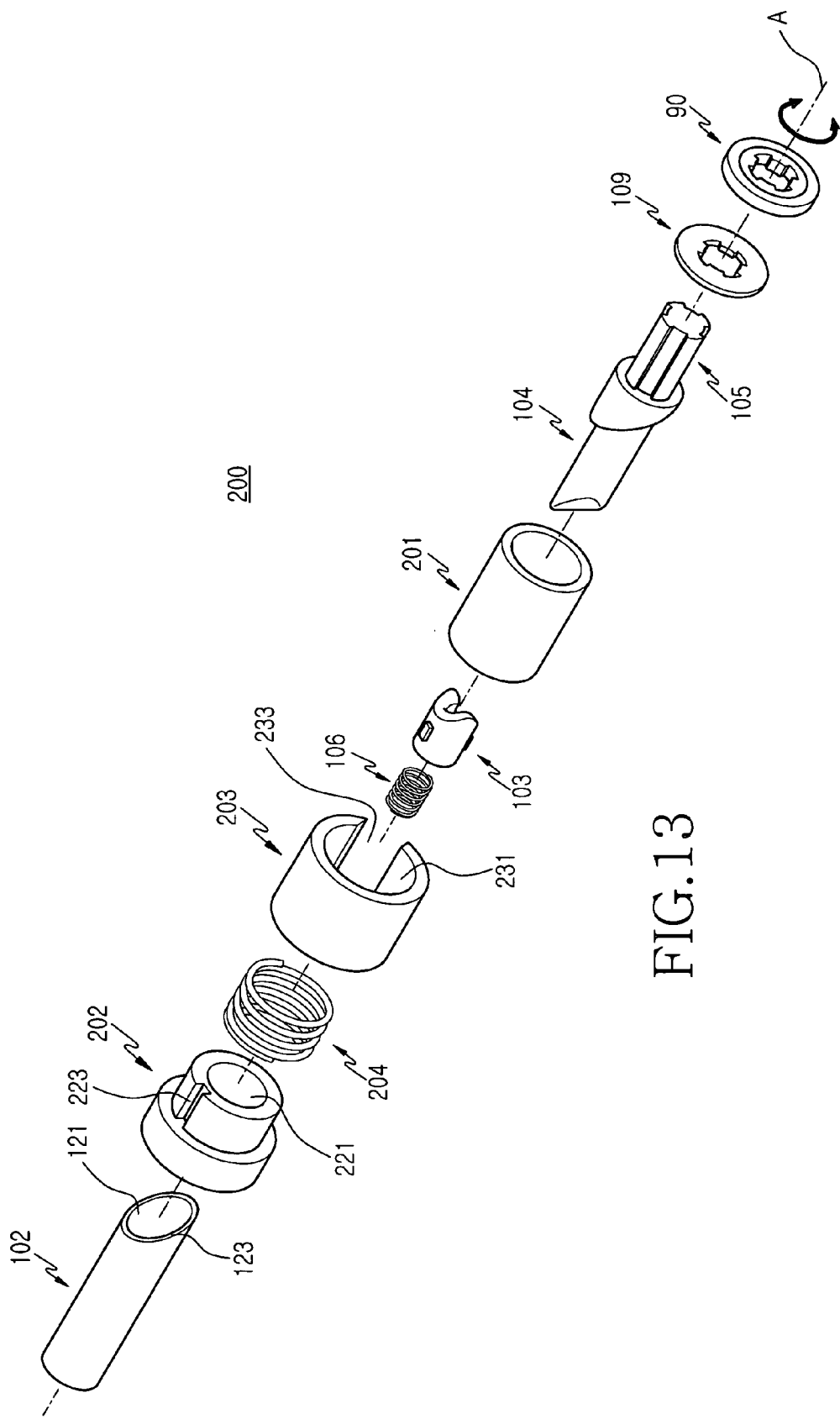
FIG. 13 is an exploded perspective view showing a hinge device of a portable terminal according to another embodiment of the present invention.
Figure 14:
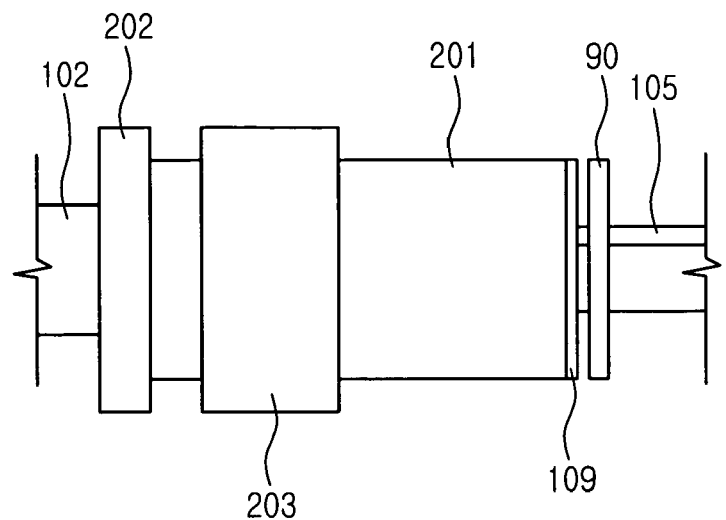
FIG. 14 is an assembled view of the hinge device shown in FIG. 13.
Figure 17:
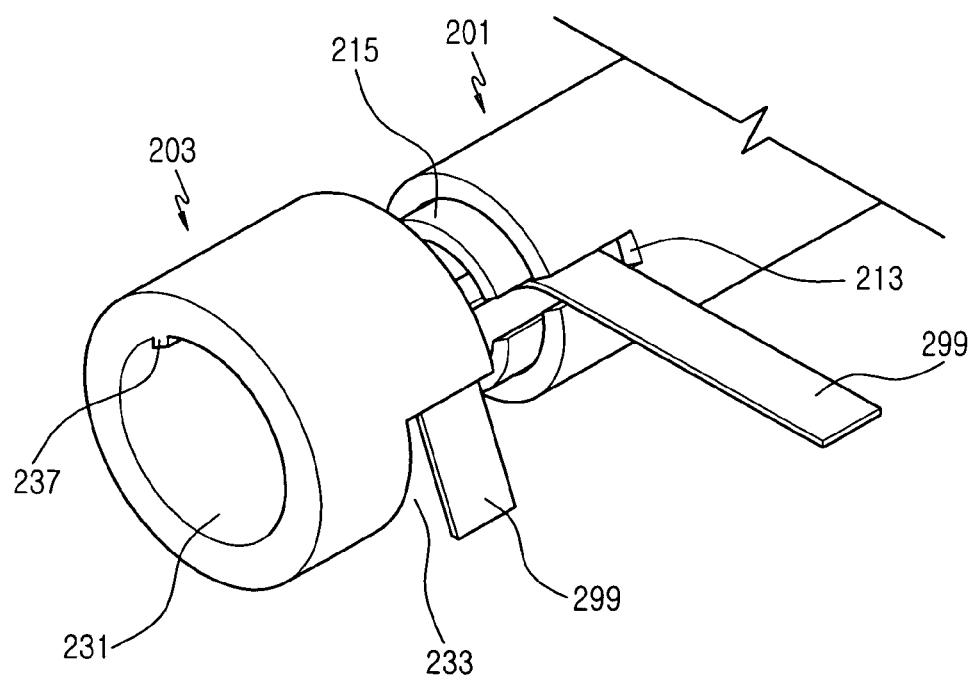
FIG. 17 is a perspective view showing a hinge housing coupled to the guide block shown in FIG. 13.

Referring to FIGS. 13 and 17, the second slit 233 is positioned adjacent to the hinge housing 201 and provides a route for the flexible printed circuit board 299 together with the first slit 213. The flexible printed circuit board 299 is introduced into the hinge housing 201 through the first slit 213, flexibly extends into the guide block 203, and is drawn out of the guide block 203 through the second slit 233.

At this time, the guide block 203 is rotated with respect to the hinge housing 201 so tensile force may be applied to the flexible printed circuit board 299 caused by the rotation of the guide block 203. In order to prevent the flexible printed circuit board 299 from being damaged by such tensile force, the flexible printed circuit board 299 can be flexibly bent within the hinge housing 201 or within the guide block 203 along a circumferential direction of the inner peripheral surface 231 of the guide block 203. Such an installation method for the flexible printed circuit board 299 may be well-known to those skilled in the art.

Similar to the hinge device 100 of the previous embodiment, the hinge device 200 of the portable terminal according to the present embodiment changes the linear movement of the hinge housing 201 and the third hinge cam 104 into the rotational movement thereof. In addition, a rotational force is generated by means of the first elastic member 106 and the second and third hinge cams 103 and 104 corresponding to rotational angles of the hinge housing 201 and the third hinge cam 104. In addition, according to the hinge device 200 of the present embodiment, after the hinge housing 201 has been linearly moved, the hinge housing 201 is moved into its initial position by means of bias force of the second elastic member 204.

Figure 18:
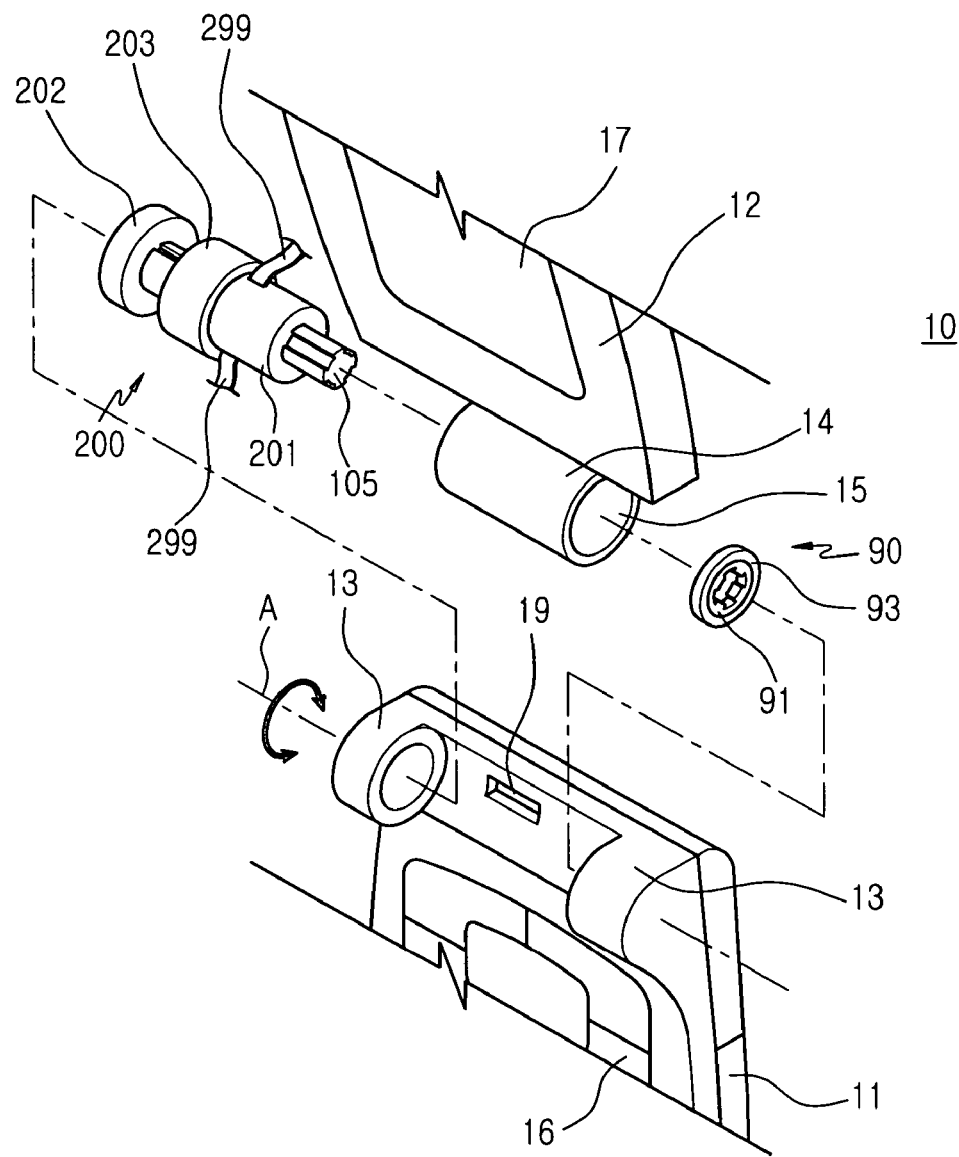
FIG. 18 is an exploded perspective view showing the hinge device of FIG. 13 coupled to a portable terminal.
Figure 19:
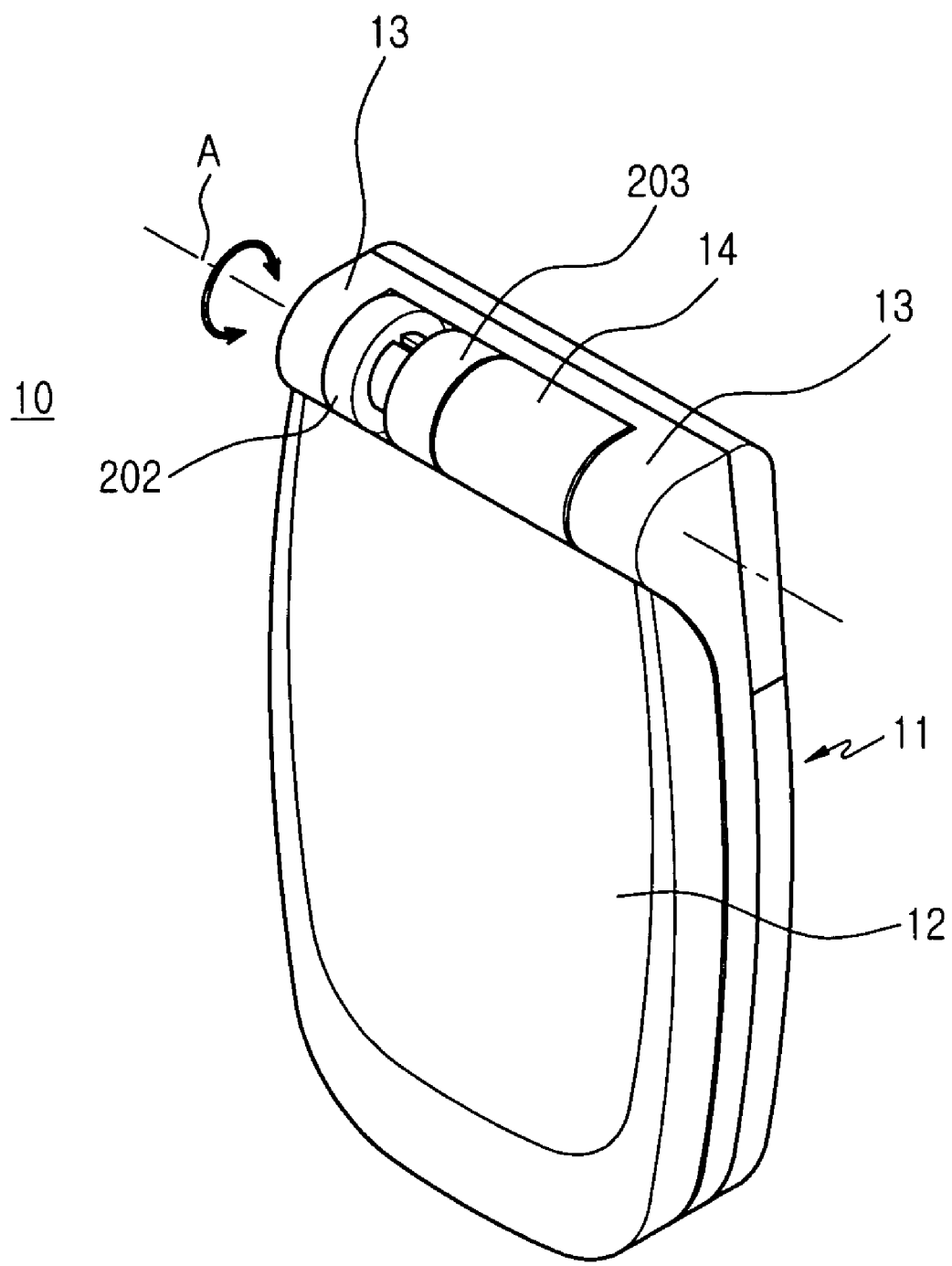
FIGS. 19 to 22 are views illustrating an opening operation of a second housing of a portable terminal shown in FIG. 18.
Figure 20:
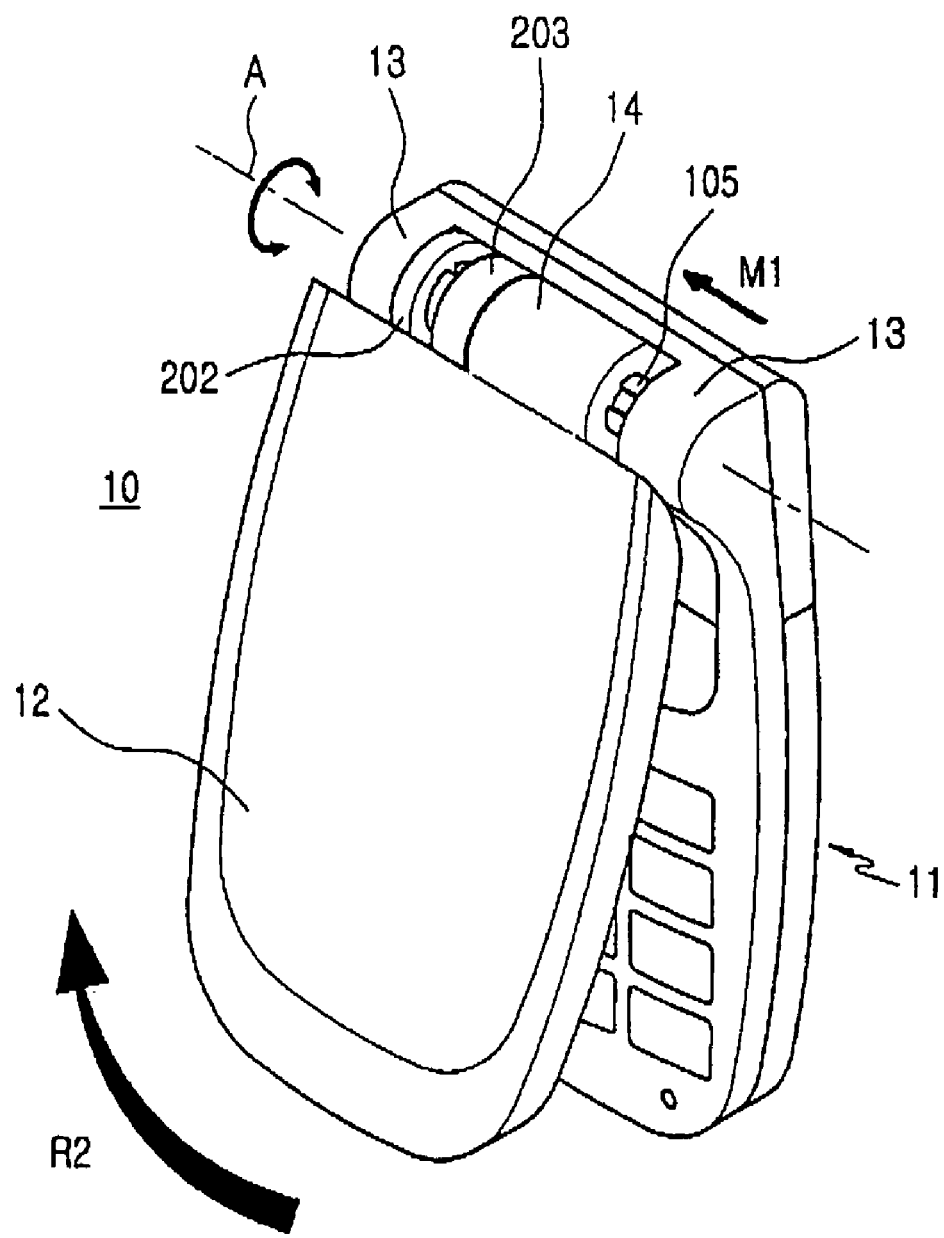
Figure 21:
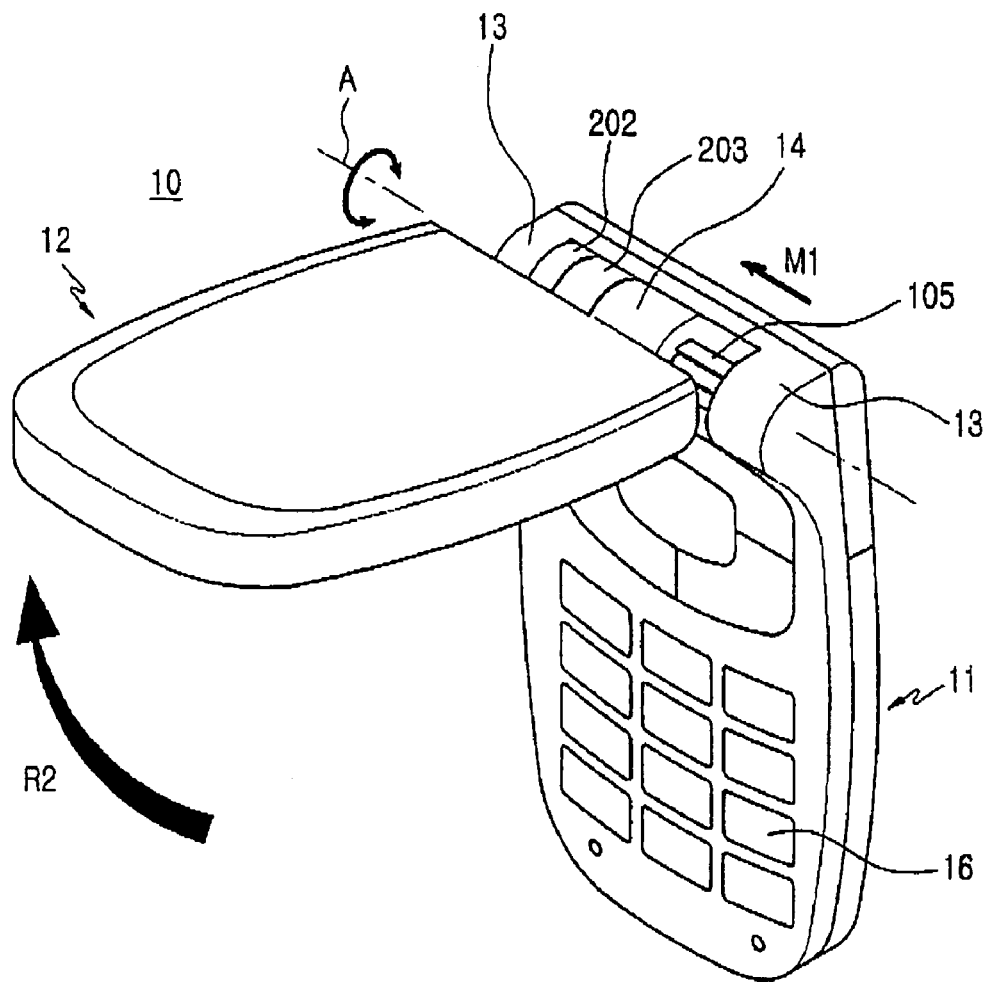

FIG. 18 is an exploded perspective view of the hinge device 200 shown in FIG. 13 coupled to the portable terminal 10 and FIGS. 19 to 22 are views illustrating an opening operation of the second housing 12 of the portable terminal 10 shown in FIG. 18.

Referring to FIG. 18, the hinge housing 201 of the hinge device 200 is accommodated in the center hinge arm 14 of the second housing 12. In addition, the hinge shaft 105 protruding beyond the end of the hinge housing 201 is coupled to one side hinge arm 13 of the first housing 11 of the terminal 10 through the roller 90 such that the hinge shaft 105 may linearly and rotatably move. The first hinge cam 102 and the support block 202 positioned at the second end of the hinge housing 201 are fixedly coupled to the other side hinge arm 13. The hinge housing 201 can linearly and rotatably move together with the second housing 12 of the portable terminal 10.

Meanwhile, the flexible printed circuit board 299 extends from an inner portion of the second housing 12 and is introduced into the hinge housing 201. The flexible printed circuit board 299 is drawn from the guide block 202 and introduced into the first housing through a guide hole 19 formed in the first housing 11. At this time, since the guide block 203 linearly moves in the first housing 11, the guide hole 19 must have a sufficient length for allowing the linear movement of the guide block 203.

Figure 22:
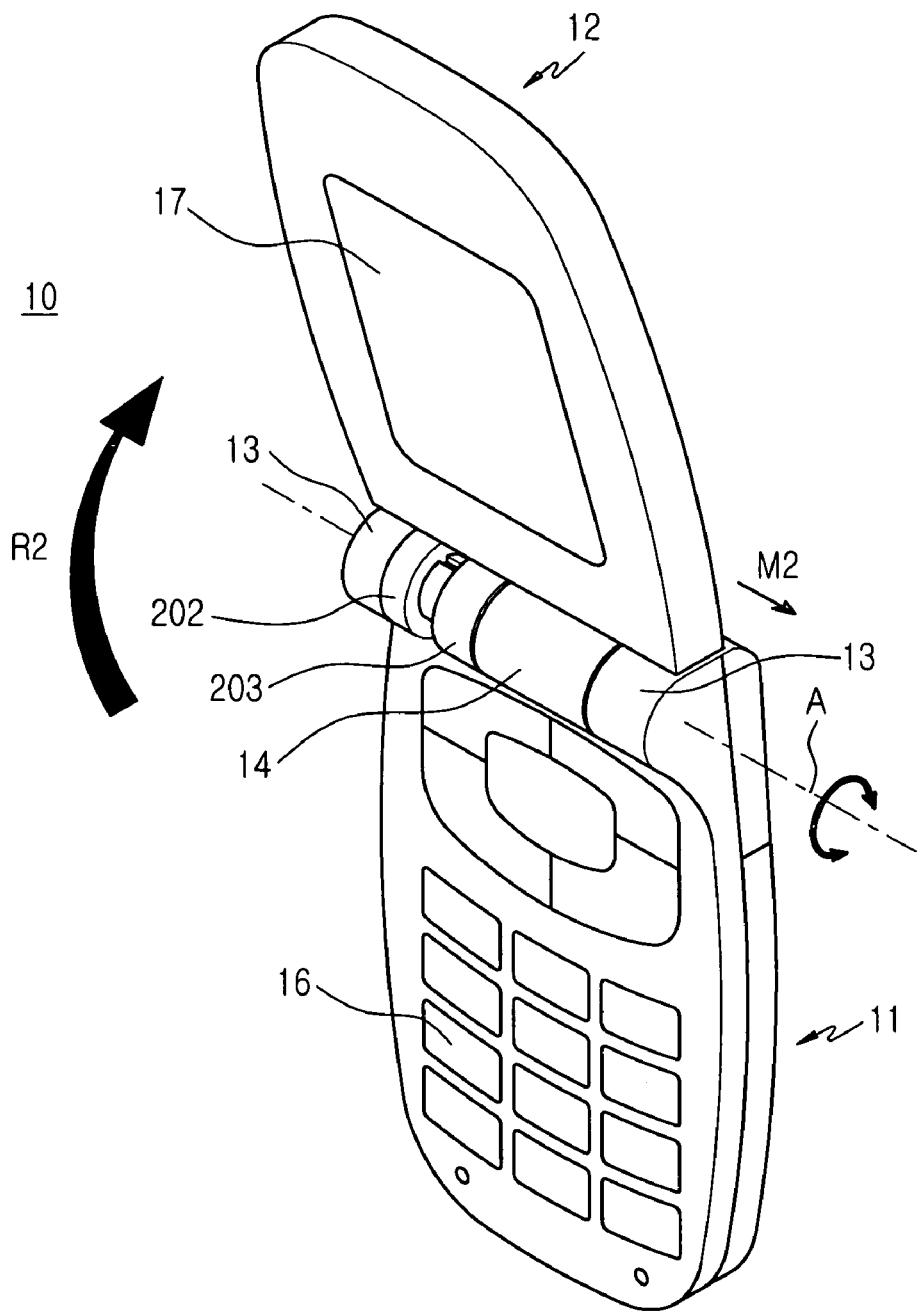

Referring to FIGS. 19 to 22, the opening/closing operation of the second housing 12 of the portable terminal 10 is identical to that of the previous embodiment. However, according to the present embodiment, the linear movement and the rotational movement of the second housing 12 may be easily achieved when the second housing 12 is moved in the fourth direction M2 so as to return to its initial position while maintaining the opened position with respect to the first housing 11 as shown in FIG. 22.

As described above, the hinge device according to the present invention includes first and second housings forming the portable terminal, which are coupled to each other in such a manner that they can be horizontally moved with respect to each other. The horizontal movement results in the hinge device applying rotational force to the first or second housing such that the first and second housings move away from each other to open the first and second housings. Therefore, the user can easily and conveniently open the portable terminal by horizontally moving one housing with respect to the other housing, which can be accomplished with one hand.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A hinge device, adapted to couple at least a first housing to a second housing of a portable terminal wherein the second housing is linearly and rotationally movable between an opened position and a closed position with respect to the first housing, the hinge device comprising:
   a first hinge cam having a cylindrical shape extending in a length direction thereof and formed at a first end thereof with a first inclined surface;
   a second hinge cam accommodated inside of the first hinge cam such that the second hinge cam linearly moves lengthwise along the first hinge cam and formed at a first end thereof with a valley-shaped portion extending in a radially outward direction thereof;
   a third hinge cam, a first end of which is partially accommodated inside of the first hinge cam in order to be rotated in the first hinge cam, formed at the first end thereof with a mountain-shaped portion engaged with the valley-shaped portion of the second hinge cam, and formed at an outer peripheral surface thereof with a second inclined surface slidably contacting the first inclined surface of the first hinge cam; and
   an elastic member accommodated inside of the first hinge cam to bias the mountain-shaped portion to engage the valley-shaped portions,
   wherein the second housing rotates and linearly moves together with the third hinge cam.

2. The hinge device as claimed in claim 1, further comprising a protrusion formed at both sides of the valley-shaped portion of the second hinge cam.

3. The hinge device as claimed in claim 1, wherein, when the third hinge cam is rotated, rotational force is generated to rotate the third hinge cam such that the mountain-shaped portion becomes engaged with the valley-shaped portion by means of the elastic member.

4. The hinge device as claimed in claim 1, wherein the third hinge cam linearly reciprocates within a predetermined range in a length direction of the first hinge cam while rotating about a hinge axis extending in a length direction of the first hinge cam.

5. The hinge device as claimed in claim 4, wherein, when the third hinge cam linearly moves towards the first hinge cam, the third hinge cam is rotated in a direction urging the first inclined surface to make surface-contact with the second inclined surface.

6. The hinge device as claimed in claim 5, wherein, as the third hinge cam is rotated, rotational force is generated to rotate the third hinge cam in a direction urging the mountain-shaped portion to engage with the valley-shaped portion by means of the elastic member.

7. The hinge device as claimed in claim 5, further comprising a protrusion formed at both sides of the valley-shaped portion of the second hinge cam wherein, as the third hinge cam is rotated, rotational force is generated by means of the elastic member when an end portion of the mountain-shaped portion moves beyond the protrusion to rotate the third hinge cam in a direction urging the mountain-shaped portion to engage the valley-shaped portion.

8. The hinge device as claimed in claim 1, further comprising a hinge housing extending in a length direction so as to receive the third hinge cam and to linearly and rotatably move together with the third hinge cam, and a hinge shaft integrally formed with a second end of the third hinge cam and extending therefrom such that an end of the hinge shaft protrudes through the first end of the hinge housing.

9. The hinge device as claimed in claim 8, further comprising a housing cap for supporting a predetermined stepped surface formed between the third hinge cam and the hinge shaft, the housing cap having a shaft hole for receiving the hinge shaft and being fixed to the first end of the hinge housing.

10. The hinge device as claimed in claim 9, further comprising at least one support slot extending lengthwise along an outer peripheral surface of the hinge shaft, and at least one support rib formed at an inner wall of the shaft hole so as to engage with the support slot for simultaneously rotating the housing cap and the hinge housing together with the third hinge cam.

11. A portable terminal having a first housing and a second housing rotatably coupled to the first housing such that the second housing is linearly and rotationally moveable between an opened position and a closed position with respect to the first housing, the portable terminal comprising:
a hinge device extending along a hinge axis, which is a rotational center of the second housing, wherein the hinge device, upon the second housing being initiated to linearly move in a direction along the hinge axis, rotationally moves the second housing about the hinge axis into the opened position or the closed position with respect to the first housing.

12. The portable terminal as claimed in claim 11, wherein the first housing includes first and second side hinge arms formed at both upper side ends of the first housing in opposition to each other, and the hinge device includes a first hinge cam having a cylindrical shape extending in the hinge axis direction and fixed to the first side hinge arm and formed at a first end thereof with a first inclined surface, a second hinge cam accommodated in the first hinge cam such that the second hinge cam linearly moves in the first hinge cam along the hinge axis direction and formed at a first end thereof with a valley-shaped portion extending in a radially outward direction thereof, a third hinge cam extending in the hinge axis direction and coupled to the second side hinge arm such that the third hinge cam linearly moves while being rotated about the hinge axis, having a first end portion partially accommodated in the first hinge cam, formed at the first end portion thereof with a mountain-shaped portion engaged with the valley-shaped portion of the second hinge cam, and formed at an outer peripheral surface thereof with a second inclined surface slidably contacting the first inclined surface of the first hinge cam, and an elastic member accommodated in the first hinge cam in order to apply a bias force in the hinge axis direction urging the mountain-shaped portion to engage with the valley-shaped portion.

13. The portable terminal as claimed in claim 12, wherein the hinge device further includes a hinge housing fixedly coupled to a first end of the second housing and extending in the hinge axis direction to receive the third hinge cam such that the hinge housing is rotated together with the third hinge cam.

14. The portable terminal as claimed in claim 12, wherein the hinge device further includes a hinge housing fixedly coupled to a first end of the second housing and extending in the hinge axis direction to receive the third hinge cam such that the hinge housing is rotated together with the third hinge cam, and a hinge shaft integrally formed with a second end of the third hinge cam and protruding from the second end of the third cam out of the first end of the hinge housing.

15. The portable terminal as claimed in claim 14, wherein the hinge device further includes a roller having an inner ring and an outer ring rotatably and concentrically coupled to each other in the hinge axis, the inner ring is coupled to the hinge shaft such that the inner ring linearly moves along the hinge shaft, and the outer ring is fixed to the second side hinge arm.

16. The portable terminal as claimed in claim 14, wherein the hinge device includes a predetermined stepped surface formed between the third hinge cam and the hinge shaft, and a housing cap having a shaft hole for receiving the hinge shaft and fixed to the first end of the hinge housing so as to support the stepped surface.

17. The portable terminal as claimed in claim 16, wherein the hinge device further includes at least one support slot extending lengthwise along an outer peripheral surface of the hinge shaft, and at least one support rib formed at an inner peripheral surface of the shaft hole so as to engage with the support slot for rotating the housing cap and the hinge housing together with the third hinge cam.

18. The portable terminal as claimed in claim 12, wherein the hinge device further includes a hinge housing fixedly coupled to the first end of the second housing and extending in the hinge axis direction to receive the third hinge cam, the third hinge cam is rotated in a direction urging the first inclined surface to make surface-contact with the second inclined surface when the second housing is linearly moved in the hinge axis direction while moving the third hinge cam towards the first hinge cam, and, as the third hinge cam rotates, rotational force is generated by means of the elastic member to rotate the third hinge cam in a direction urging the valley-shaped portion to engage with the mountain-shaped portion.

19. The portable terminal as claimed in claim 18, wherein the hinge device further includes a protrusion formed at both sides of the valley-shaped portion of the second hinge cam and protruding in the hinge axis direction, and, when an end of the mountain-shaped portion moves beyond the protrusion due to rotation of the third hinge cam, rotational force is generated by means of the elastic member to rotate the third hinge cam in a direction urging the valley-shaped portion to engage with the mountain-shaped portion, so that the second housing is rotatably moved between the opened position and closed position with respect to the first housing.

20. A hinge device, adapted to couple at least a first housing to a second housing of a portable terminal wherein the second housing is linearly and rotationally moveable between an opened position and a closed position with respect to the first housing, the hinge device comprising:
a first hinge cam having a cylindrical shape extending in a length direction thereof and formed at a first end thereof with a first inclined surface;
a second hinge cam accommodated inside of the first hinge cam such that the second hinge cam linearly moves lengthwise along the first hinge cam and formed at a first end thereof with a valley-shaped portion extending in a radially outward direction thereof;
a third hinge cam, a first end of which is partially accommodated inside of the first hinge cam in order to be rotated in the first hinge cam, formed at the first end thereof with a mountain-shaped portion engaged with the valley-shaped portion of the second hinge cam, formed at an outer peripheral surface thereof with a second inclined surface slidably contacting the first inclined surface of the first hinge cam, and having a hinge shaft extending in the length direction thereof from a second end of the third hinge cam;

a first elastic member accommodated inside of the first hinge cam in order to apply a bias force in the length direction urging the mountain-shaped portion to engage with the valley-shaped portion;

a hinge housing extending in the length direction thereof so as to accommodate the third hinge cam therein while linearly or rotatably moving together with third hinge cam, the hinge shaft protruding out of a first end of the hinge housing;

a support block having a cylindrical shape, formed with a hole extending in the length direction thereof, and coupled to the first hinge cam; and a second elastic member interposed between the hinge housing and the support block so as to apply a bias force in the length direction urging the hinge housing to move away from the support block, wherein the second housing rotates and linearly moves together with the third hinge cam.

21. The hinge device as claimed in claim 20, wherein the support block is fixedly coupled to the first hinge cam.

22. The hinge device as claimed in claim 20, further comprising a guide block having a cylindrical shape rotatably coupled to a second end of the hinge housing and coupled to the support block in such a manner that the guide block linearly moves on the support block.

23. The hinge device as claimed in claim 22, wherein the guide block includes a support rib extending radially outward from an inner peripheral surface of the guide block, and the second elastic member is interposed between the support block and the support rib.

24. The hinge device as claimed in claim 22, further comprising a first slit extending a predetermined length from the second end of the hinge housing, and a second slit formed at one end of the guide block, wherein a flexible printed circuit board is introduced into the hinge housing through the first slit, flexibly extends into the guide block in the hinge housing, and is drawn out of the guide block through the second slit.

25. The hinge device as claimed in claim 24, wherein the flexible printed circuit board is flexibly bent along an inner peripheral surface of the hinge housing by a predetermined angle, and then extends into the guide block.

26. The hinge device as claimed in claim 24, wherein the flexible printed circuit board is flexibly bent along an inner peripheral surface of the guide block by a predetermined angle, and then is drawn out of the guide block through the second slit.

27. The hinge device as claimed in claim 22, further comprising a guide rib extending in a circumferential direction of the second end of the hinge housing and protruding a predetermined length so as to be rotatably coupled with the guide block.

28. The hinge device as claimed in claim 22, further comprising a sliding slot extending lengthwise along an outer peripheral surface of the support block and a sliding protrusion protruding from an inner peripheral surface of the guide block a predetermined height so as to linearly reciprocate within the sliding slot.

29. The hinge device as claimed in claim 20, wherein, when the third hinge cam linearly moves towards the first hinge cam, the third hinge cam is rotated in a direction urging the first inclined surface to make surface-contact with the second inclined surface and, as the third hinge cam is rotated, rotational force is generated by means of the first elastic member so as to rotate the third hinge cam in a direction urging the mountain-shaped portion to engage with the valley-shaped portion.

* * * * *